(12) United States Patent
Simmons et al.

(10) Patent No.: US 11,782,844 B2
(45) Date of Patent: *Oct. 10, 2023

(54) VECTOR PROCESSOR STORAGE

(71) Applicant: Nyriad Inc., Dover, DE (US)

(72) Inventors: Xavier Aldren Simmons, Cambridge (NZ); Jack Spencer Turpitt, Cambridge (NZ); Rafael John Patrick Shuker, Cambridge (NZ); Tyler Wilson Hale, Cambridge (NZ); Alexander Kingsley St. John, Cambridge (NZ); Stuart John Inglis, Cambridge (NZ)

(73) Assignee: Nyriad Inc., Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,721

(22) Filed: Feb. 1, 2022

(65) Prior Publication Data
US 2022/0156200 A1 May 19, 2022

Related U.S. Application Data

(63) Continuation of application No. 16/556,711, filed on Aug. 30, 2019, now Pat. No. 11,263,145.
(Continued)

(51) Int. Cl.
*G06F 9/30* (2018.01)
*G06F 12/10* (2016.01)
(Continued)

(52) U.S. Cl.
CPC .............. *G06F 12/10* (2013.01); *G06F 3/065* (2013.01); *G06F 3/0607* (2013.01);
(Continued)

(58) Field of Classification Search
None
See application file for complete search history.

(56) References Cited

U.S. PATENT DOCUMENTS 5,459,857 A 10/1995 Ludlam et al.
5,502,836 A 3/1996 Hale et al.
(Continued)

FOREIGN PATENT DOCUMENTS

CN 104410725 A 3/2015
CN 107102957 A 8/2017
WO 2012052800 A1 4/2012

OTHER PUBLICATIONS

Simmons, Xavier Aldren, et al., "Vector Processor Storage," filed Aug. 30, 2019, U.S. Appl. No. 16/556,711.
(Continued)

*Primary Examiner* — Michael Sun

(57) ABSTRACT

A method comprising: receiving, at a vector processor, a request to store data; performing, by the vector processor, one or more transforms on the data; and directly instructing, by the vector processor, one or more storage device to store the data; wherein performing one or more transforms on the data comprises: erasure encoding the data to generate n data fragments configured such that any k of the data fragments are usable to regenerate the data, where k is less than n; and wherein directly instructing one or more storage device to store the data comprises: directly instructing the one or more storage devices to store the plurality of data fragments.

20 Claims, 5 Drawing Sheets

Related U.S. Application Data

(60) Provisional application No. 62/746,981, filed on Oct. 17, 2018, provisional application No. 62/725,703, filed on Aug. 31, 2018, provisional application No. 62/725,691, filed on Aug. 31, 2018.

(51) Int. Cl.
| | |
|---|---|
| *G06F 11/10* | (2006.01) |
| *G06F 12/12* | (2016.01) |
| *G06F 12/0815* | (2016.01) |
| *G06F 12/02* | (2006.01) |
| *G06F 3/06* | (2006.01) |
| *G06F 9/38* | (2018.01) |
| *G06F 12/14* | (2006.01) |

(52) U.S. Cl.
CPC ...... *G06F 9/30036* (2013.01); *G06F 9/30123* (2013.01); *G06F 9/3877* (2013.01); *G06F 11/1004* (2013.01); *G06F 11/1088* (2013.01); *G06F 12/0246* (2013.01); *G06F 12/0815* (2013.01); *G06F 12/12* (2013.01); *G06F 12/1408* (2013.01); *G06F 3/0679* (2013.01); *G06F 2212/1052* (2013.01); *G06F 2212/657* (2013.01)

(56) References Cited

U.S. PATENT DOCUMENTS

| | | | |
|---|---|---|---|
| 6,467,016 | B1 | 10/2002 | Kanai |
| 7,822,856 | B2* | 10/2010 | Zuckerman ......... H04L 67/1001 709/219 |
| 9,092,152 | B1 | 7/2015 | Piszczek et al. |
| 9,116,621 | B1 | 8/2015 | Pintiysky et al. |
| 9,158,927 | B1* | 10/2015 | Franklin ............... G06F 21/602 |
| 9,164,702 | B1 | 10/2015 | Nesbit et al. |
| 9,268,640 | B1 | 2/2016 | Foley et al. |
| 9,639,457 | B1 | 5/2017 | Piszczek et al. |
| 9,823,968 | B1 | 11/2017 | Fugini et al. |
| 10,152,376 | B2* | 12/2018 | Danilov ............... G06F 11/1076 |
| 10,739,996 | B1 | 8/2020 | Ebsen et al. |
| 11,263,144 | B2 | 3/2022 | Inglis et al. |
| 11,347,653 | B2 | 5/2022 | Inglis et al. |
| 2004/0123032 | A1 | 6/2004 | Talagala et al. |
| 2005/0080990 | A1 | 4/2005 | Mereddy et al. |
| 2006/0212782 | A1* | 9/2006 | Li ..................... H03M 13/1575 714/784 |
| 2007/0168632 | A1 | 7/2007 | Zeevi et al. |
| 2008/0086620 | A1 | 4/2008 | Morris |
| 2009/0268903 | A1 | 10/2009 | Bojinov et al. |
| 2011/0126045 | A1 | 5/2011 | Bennett |
| 2012/0268469 | A1 | 10/2012 | Shchepetov et al. |
| 2013/0016109 | A1 | 1/2013 | Garanzha |
| 2013/0067174 | A1 | 3/2013 | Moss et al. |
| 2014/0006850 | A1* | 1/2014 | Aliev ................. G06F 11/2053 714/6.24 |
| 2014/0075104 | A1 | 3/2014 | Buswell |
| 2014/0281364 | A1 | 9/2014 | Buschardt et al. |
| 2014/0325117 | A1 | 10/2014 | Canepa et al. |
| 2015/0205663 | A1 | 7/2015 | Sundaram et al. |
| 2017/0061566 | A1 | 3/2017 | Min et al. |
| 2017/0132151 | A1 | 5/2017 | Bakke et al. |
| 2017/0147516 | A1* | 5/2017 | De ........................ G06F 3/0685 |
| 2017/0228313 | A1 | 8/2017 | Boitei |
| 2017/0272209 | A1 | 9/2017 | Yanovsky et al. |
| 2018/0004413 | A1 | 1/2018 | Zhang |
| 2018/0150347 | A1 | 5/2018 | Vidyapoornachary et al. |
| 2018/0181324 | A1 | 6/2018 | Danilov et al. |
| 2019/0095123 | A1 | 3/2019 | Lin |
| 2019/0129834 | A1 | 5/2019 | Purkayastha et al. |
| 2019/0138445 | A1 | 5/2019 | Lee et al. |
| 2019/0391926 | A1 | 12/2019 | Lin |
| 2020/0073663 | A1 | 3/2020 | Simmons et al. |
| 2020/0073818 | A1 | 3/2020 | Inglis et al. |
| 2020/0073824 | A1 | 3/2020 | Inglis et al. |

OTHER PUBLICATIONS

Nglis, et al., "Persistent Storage Device Management," filed Aug. 19, 2019, U.S. Appl. No. 16/544,605.

Nglis, et al., "Block Device Interface Using Non-Volatile Pinned Memory," filed Aug. 30, 2019, U.S. Appl. No. 16/556,575.

M. L. Curry, "A highly reliable GPU-based RAID system", (Doctoral dissertation), 2010.

R.A. Patel, et al., "Parallel lossless data compression on the GPU" 2012 Innovative Parallel Computer (InPar) 2012.

Foreign Communication From a Related Counterpart Application, Extended European Search Report dated Jan. 16, 2020, European Application No. 19194744.9 filed on Aug. 30, 2019.

Foreign Communication From a Related Counterpart Application, Partial European Search Report dated Jan. 30, 2020, European Application No. 19194748.0 filed on Aug. 30, 2019.

Anujan Varma et al: "Destage algorithms for disk arrays with non-volatile caches", ACM SIGARCH Computer Architecture News, ACM Special Interest Group on Computer Architecture, 2 Penn Plaza, Suite 701 New York NY 10121-0701 USA, vol. 23, No. 2, May 1, 1995 (May 1, 1995), pp. 83-95, XP058084661, ISSN: 0163-5964, DOI: 10.1145/225830.224042.

Anonymous: "CUDA 2.2 Pinned Memory APIs", Mar. 1, 2009 (Mar. 1, 2009), XP055655605, Retrieved from the Internet: URL: https://devtalk.nvidia.com/cmd/default/download-comment-attachment/50683/ [retrieved on Jan. 8, 2020].

Foreign Communication From a Related Counterpart Application, Extended European Search Report dated Jan. 27, 2020, European Application No. 19193027.0 filed on Aug. 22, 2019.

Office Action dated Mar. 1, 2021, U.S. Appl. No. 16/544,605, filed Aug. 19, 2019.

Final Office Action dated Jul. 8, 2021, U.S. Appl. No. 16/544,605, filed Aug. 19, 2019.

Notice of Allowance dated Jan. 18, 2022, U.S. Appl. No. 16/544,605, filed Aug. 19, 2019.

Notice of Allowance dated Feb. 18, 2021, U.S. Appl. No. 16/556,711, filed Aug. 30, 2019.

Office Action dated Sep. 25, 2020, U.S. Appl. No. 16/556,575, filed Aug. 30, 2019.

Final Office Action dated Apr. 12, 2021, U.S. Appl. No. 16/556,575, filed Aug. 30, 2019.

Office Action dated Apr. 22, 2021, U.S. Appl. No. 16/556,575, filed Aug. 30, 2019.

Notice of Allowance dated Oct. 15, 2021, U.S. Appl. No. 16/556,575, filed Aug. 30, 2019.

Nglis, et al., "Block Device Interface Using Non-Volatile Pinned Memory," filed Jan. 19, 2022, U.S. Appl. No. 17/579,264.

Foreign Communication from a Related Counterpart Application, European Examination Report dated Apr. 21, 2023, European Application No. 19194748.0 filed on Aug. 30, 2019.

Office Action dated Jan. 20, 2023, U.S. Appl. No. 17/731,038, filed Apr. 27, 2022.

Office Action dated Octobers, 2022, U.S. Appl. No. 17/579,264, filed Jan. 19, 2022.

Nglis, et al., "Persistent Storage Device Management," filed Apr. 27, 2022, U.S. Appl. No. 17/731,038.

* cited by examiner

US 11,782,844 B2

VECTOR PROCESSOR STORAGE

CROSS-REFERENCE TO RELATED APPLICATIONS

This application is a continuation of and claims priority under 35 U.S.C. § 120 to U.S. patent application Ser. No. 16/556,711 filed on Aug. 30, 2019, entitled "VECTOR PROCESSOR STORAGE" by Xavier Aldren SIMMONS, et al. The application also claims priority to U.S. Provisional Application No. 62/746,981, filed Oct. 17, 2018. The present application also claims priority to U.S. Provisional Application No. 62/725,703, filed Aug. 31, 2018. The present application also claims priority to U.S. Provisional Application No. 62/725,691, filed Aug. 31, 2018, all of which are incorporated herein by reference in their entirety for all purposes.

FIELD

This generally relates to vector processor storage.

BACKGROUND

A conventional computer system comprises one or more CPUs (central processing units). One role of a CPU in such systems is to administer the various peripherals of the system.

For example, it is common for data to be stored to and retrieved from storage devices. A CPU can instruct a storage controller to retrieve a piece of data from storage and write it to a specific memory address and can instruct a storage controller to write a piece of data to storage. A CPU is therefore conventionally involved in any data storage and retrieval. Thus, even if a program is being executed elsewhere in the computer system, such as on a GPU (graphics processing unit), control generally shifts back to the CPU to handle data storage and retrieval. In some cases, this delays computation being performed on a GPU, and may result in an overall slower computer system.

SUMMARY

In a first example embodiment, there is provided a method comprising: receiving, at a vector processor, a request to store data; performing, by the vector processor, one or more transforms on the data; and directly instructing, by the vector processor, one or more storage device to store the data; wherein performing one or more transforms on the data comprises: erasure encoding the data to generate n data fragments configured such that any k of the data fragments are usable to regenerate the data, where k is less than n; and wherein directly instructing one or more storage device to store the data comprises: directly instructing the one or more storage devices to store the plurality of data fragments.

In a second example embodiment, there is provided a method comprising: receiving, at a vector processor, a request to retrieve data; directly instructing one or more storage devices to retrieve a plurality of data fragments associated with the data from the one or more storage devices; and performing, by the vector processor, one or more transforms on the data fragments to obtain the data; wherein the plurality of data fragments comprises at least k data fragments among n erasure encoded data fragments, where any k of the data fragments are usable to regenerate the data, and k is less than n; and wherein performing one or more transforms on the data fragments to obtain the data comprises: erasure decoding at least k data fragments to generate the data.

BRIEF DESCRIPTION OF THE DRAWINGS

The accompanying drawings form part of the specification and are intended to illustrate some embodiments. The drawings, together with the general description given above and the detailed description of embodiments given below, explain such embodiments.

DETAILED DESCRIPTION

In some embodiments, a vector processor can be used to read data from and write data to one or more storage devices, and this may occur by the vector processor directly interfacing with the storage devices.

The vector processor may implement this by running a driver on the vector processor. The driver may be a long-running kernel which receives instructions to retrieve or store data (for example from a CPU or other device). The vector processor can then interface directly with the storage devices and perform any necessary computations, such as encoding or decoding, encrypting or decrypting, or logging. While a CPU may be involved to initiate the kernel or to send instructions to the vector processor, the vector processor may not be involved in communicating with the storage devices.

In one embodiment, when a vector processor receives a request to store data, this is transformed for storage on storage devices. In another embodiment, when the vector processor receives a request to read data, data is retrieved directly from the storage devices and transformed to obtain the data. In this way, the vector processor may function as a storage controller without a CPU necessarily mediating interaction between the vector processor and the storage devices.

Receiving a Request to Store Data

Figure 1:
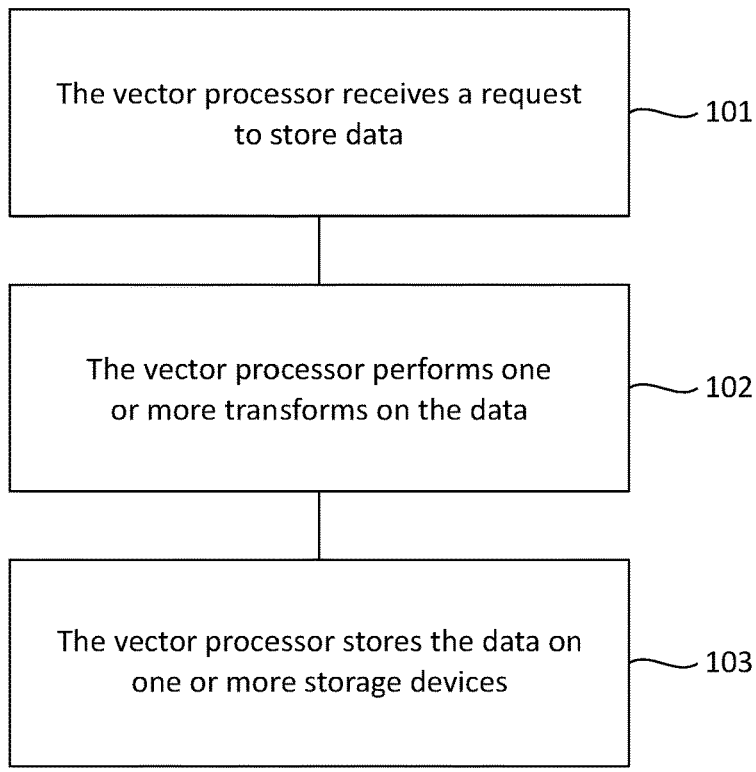
FIG. 1 shows a flow chart of a method which relates to a vector processor storing data according to one embodiment.

FIG. 1 shows a flow chart of a method 100, which relates to a vector processor storing data according to one embodiment.

At step 101, the vector processor receives a request to store data.

The request may be in the form of a write instruction from a kernel running on the vector processor. This write instruction indicates that the vector processor should write the data stored at a first memory address to storage. The first memory address may be a virtual memory address in an address space accessible from any processor in the computer system. The write instruction need not specify where the data should be stored: it simply instructs the vector processor to store the data in a general sense, on the understanding that the vector processor is responsible for the details of how the data is stored.

In some embodiments, the write instruction is executed based on an instruction from another component in the computer system. For example, a long-running kernel executing on the vector processor may poll a predetermined virtual memory address associated with the component to determine if an instruction has been written to the address. When this occurs, the kernel may cause the vector processor to execute the write instruction using the data stored in that address or in a second predetermined virtual memory address.

While the term "data" is used to refer to data generally of any size, it may specifically refer to a block of data. That is, it may be an amount of data corresponding to a file system block size, such as 4096 bytes. That is, a request to store data may be a request to store a block of data.

Transforming the Data

At step 102, the vector processor performs one or more transforms on the data. The transforms may include one or more of encrypting, encoding, compressing, deduplicating, or logging.

The transforms may be specified as configurable plugins. These may by selected based on particular implementation requirements. For example, a first implementation may require a level of encryption, and a second implementation may not require any encryption.

These may be specified by configuring, in the driver, that specific plugins from a set of available plugins should be applied. In some cases, the plugins may be configured based on specified parameters. For example, for an encoding plugin, the level of parity may be adjusted in the plugin.

The vector processor first accesses the data. This may involve copying data stored at the first memory address to a second memory address which corresponds to a memory, such as vector processor local memory. This copying may be done automatically. For example, when the vector processor accesses a virtual memory address corresponding to unified memory, the data may be transferred from main memory to vector processor memory.

The vector processor then transforms the data. These transforms can be invertible transforms, such that the original contents can be recovered by performing an inverse function. For example, encryption, encoding, compression, deduplication, and the addition of further information are usually invertible functions, since the original information can be obtained by an inverse function. The transforms may be performed in a predetermined order. For example, encryption may be performed before encoding.

One transform may be to encrypt the data. This can be performed using RSA, AES, or any other appropriate encryption algorithm. This may avoid the data being read if the underlying storage devices are compromised.

Another transform may be to encode the data by adding parity information to the data through use of an error correcting code before splitting the data into data fragments. This allows for the original data to be recreated based on the fragments even if some fragments are erroneous. This error correcting code may be an erasure code, which allows for recreating the original data even if some of the fragments are entirely lost.

A Reed-Solomon code is an example of an erasure code. A piece of data, such as a block, is encoded using the Reed-Solomon algorithm to form a number of codewords. Each codeword comprises n symbols: k of these carry information from the original data, and the remaining are computed and can be used to reconstruct the original data. Each codeword can be broken up to form a data fragment. The parity n-k may be selected based on the type of data, system default, user preference or any other suitable approach. Because of how Reed-Solomon codes work, even if up to n-k fragments are lost, the original data can still be obtained.

For example, for a Reed-Solomon code using 2:1 parity, there is 1 unit of parity information added for every 2 units of original data. This means that even if 1 fragment is lost, the original data can be regenerated from any 2 other fragments. 15:5 parity refers to there being 5 units of parity added for every 15 units of original data. If any 5 fragments are lost, the original data can be regenerated from any 15 of the 20 remaining fragments.

Thus the vector processor may encode the data to form n data fragments, such that any k of the data fragments can be used to regenerate the data, k being less than or equal to n.

Higher parity typically means that a greater number of data fragments can be lost before the data is unrecoverable. In addition, a higher ratio of parity data to actual data may reduce the overall quantity of data that is stored for a given resilience. However, higher parity typically tends to exponentially increase the level of computation required for encoding.

In addition, this may include computing a cryptographic hash based on the data, and encoding this as part of the data.

A further transform may be to log the storage event in an event log. This may include a timestamp and a cryptographic hash of the data. While logging does not affect the data being stored, it can be treated as a transform of the data for the purpose of the order of transforms.

By using a vector processor to perform the transforms, relatively high quality transforms can be performed more efficiently compared to using a CPU. For example, in the case of encoding, a high level of parity may be used. In addition, this can be done in substantially real-time, so that the transforms do not materially delay the storage process (for example, by adding less than a few milliseconds of time to storage, for example).

Storing Data

At step 103, the vector processor stores the data on one or more storage devices. Where the data has been transformed into multiple data fragments, those data fragments may be stored on the one or more storage devices.

Storing generally involves directly instructing one or more storage devices to store at least part of the data (such as one of more of the data fragments). In this case, directly instructing means instructing without the mediation of a CPU. For example, the vector processor may place at least part of the data in memory and instruct a local storage peripheral to read and store the data from that memory using direct memory access. The vector processor may alternatively instruct a NIC to send the data to a remote storage system, such as a remote server. In either case, the interaction between the vector processor and the peripheral can occur with no or minimal involvement of the CPU. For example, the CPU involvement may be limited to running a driver to cause the peripheral to perform an action.

A plurality of storage devices may be instructed in parallel. This means that the vector processor instructs at least two devices simultaneously to store respective parts of the data.

A "storage device" refers to any device which can be used to store data. While this may include conventional storage devices, such as hard disk drives or solid-state drives, it can also include network devices (to allow data to be stored at a system across a network) or a storage controller (which in turn is connected to further storage devices). Thus, a storage device is not necessarily limited to a device which stores data local to the storage device.

The vector processor may require that the storage device acknowledge storage of the data fragments. This may occur by the storage device writing an acknowledgment to a memory address. The vector processor can continually poll this address until the appropriate acknowledgment appears. Alternatively, the vector processor may simply attempt to read the data fragment from the storage device. If a read provides the data fragment, then this is an acknowledgment that the data fragment was stored.

In some cases, it is acceptable for less than all the storage devices to acknowledge storage of the corresponding data fragments. For example, where there are n data fragments but only k data fragments are needed to recreate the data, it may be sufficient for storage devices corresponding to k data fragments (or a number greater than k but less than n) to acknowledge storage. In this case, even if the remaining data fragments are not stored, because at least k data fragments were stored, the original data can be regenerated.

Alternatively, acknowledgement may be omitted if the probability of data loss is below a threshold. For example, a heuristic analysis may indicate that data loss occurs in less than 1 in 1 billion data storage events. In this case, this may be seen as an acceptable risk in order to maximize speed.

In some cases, a data fragment may be cached (such as in non-volatile memory). Once the data fragment is cached, it may be considered to be acknowledged. When an actual acknowledgment is received, the data fragment may be removed from the cache.

When an acknowledgement is received (or optionally when a storage instruction is sent), the vector processor may update a metadata register. This can link the data with the address that at least a data fragment is stored. The data may be identified by a name or a hash of the data. Additionally or alternatively, the data (or a name of the data) may be linked in metadata at one of more of the storage devices, or may be self-described by being stored based on a hash of the data fragment.

Following step 103, the vector processor may acknowledge that the data was stored. The form of this acknowledgment depends on how the original storage request was initiated. For example, this may occur via the kernel reading an acknowledgment from a predetermined memory address.

Receiving a Request to Retrieve Data

Figure 2:
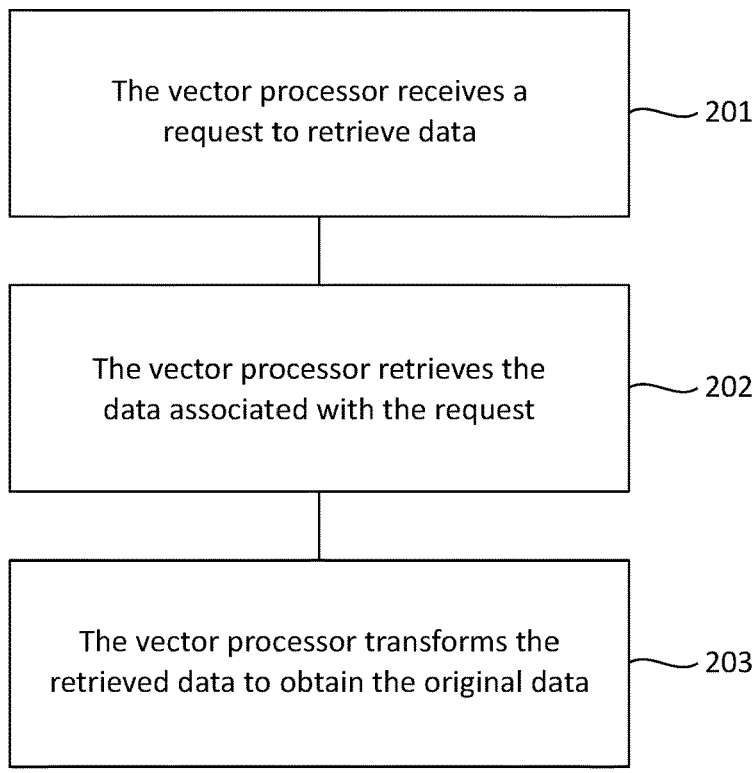
FIG. 2 shows a flow chart of a method which relates to a vector processor retrieving data according to one embodiment.

FIG. 2 shows a flow chart of a method 200, which relates to a vector processor retrieving data according to one embodiment.

At step 201, the vector processor receives a request to retrieve data.

The request may be in the form of a read instruction from a kernel running on the vector processor. This read instruction indicates that the vector processor should read a certain piece of data from storage and write it to a first memory address. The first memory address is typically a unified memory address. The data may be identified by a name or a location. In the case of a name, this may be a hash of the original data.

In some embodiments, the read instruction is executed based on an instruction from another component. For example, a long-running kernel executing on the vector processor may poll a predetermined virtual memory address to determine if another component of the computer system has written a predetermined value to the address. When this occurs, the kernel may cause the vector processor to execute the read instruction using the data stored in that address or in one or more second predetermined virtual memory addresses.

Retrieving the Fragments

At step 202, the vector processor retrieves the data associated with the request.

This may involve retrieving multiple parts of the data, such as multiple data fragments generated during encoding in an earlier step 102 and stored in an earlier step 103. The data fragments may be erasure encoded data fragments.

In some cases, the vector processor may request a first set of data fragments. The first set may be all the data fragments corresponding to the data, or may be a number sufficient to regenerate the data.

Because not all fragments necessarily need to be retrieved to regenerate the data, the vector processor may only instruct a subset of storage devices to provide corresponding fragments.

Where one storage device holds enough fragments to regenerate the original data a request may be initially sent only to that storage device. This may provide for low latency requests since the fragments can be obtained from one source.

In some cases, the vector processor may determine that a data fragment is not available from a particular storage device. This may occur for example if the storage device has failed, if the expected delay in the first storage device providing the data fragment is above a threshold (as assessed by an appropriate model), if a communication link with the storage device has failed, or if the data fragment cannot be retrieved from the storage device for any other reason.

In such cases, the vector processor may send further instructions to other devices to obtain further data fragments.

Alternatively, the instructions may be sent to multiple storage devices. This may occur in parallel. Any storage device storing a fragment corresponding to the identifier can then respond. If one of the storage devices is a second vector processor, the second vector processor may further broadcast the instruction to any further storage devices in communication with the second vector processor. In this way, even if some storage devices are slow to respond or otherwise unavailable, enough fragments to recreate the request will likely be provided within a relatively short period.

Generating the Data

At step 203, the vector processor transforms the retrieved data to obtain the original data. This occurs by performing transformations to invert those performed at step 102. The transforms may include one or more of decrypting, decoding, decompressing, un-deduplicating, or logging.

For example, where the retrieved data comprises data fragments encoded using the Reed-Solomon algorithm, an appropriate decoding algorithm may be the Berlekamp-Welch algorithm. This involves generating a solution to a set of linear algebra equations.

A solution will only be found once sufficient data fragments have been written to the memory addresses specified at step 202. However, rather than checking this directly (such as via an acknowledgment), the vector processor may continuously or periodically try to generate a solution based on the data at the memory addresses specified at step 202 based on a predetermined period (such as every 100 ms). This attempt will fail initially based on whatever data was previously in the memory and will continue to fail until sufficient data fragments have been written. However, once any k data fragments have been written to the memory addresses, the decoding algorithm produces a result. This result is the data that was originally stored. If the decoded data includes a checksum, this may be used to verify that the data was decoded correctly.

Once the original data is obtained, this can be stored at the first memory address from the request to retrieve. Thus, from the point of view of the requester, the data is simply requested and appears in the designated memory address. That is, the interaction with the storage devices and the decoding happens in a way that is hidden from the requester.

In addition, because the vector processor can handle any computationally intensive transforms, relatively high-quality transforms can be performed more efficiently compared to using a CPU. This can be done in substantially real-time, so that the transforms do not materially delay the retrieval process (for example, by adding less than a few milliseconds of time to retrieval, for example).

Determining when Data is Written

In step 203, it is noted that a vector processor can determine when encoded data is written to memory by correctly decoding the data.

Figure 3:
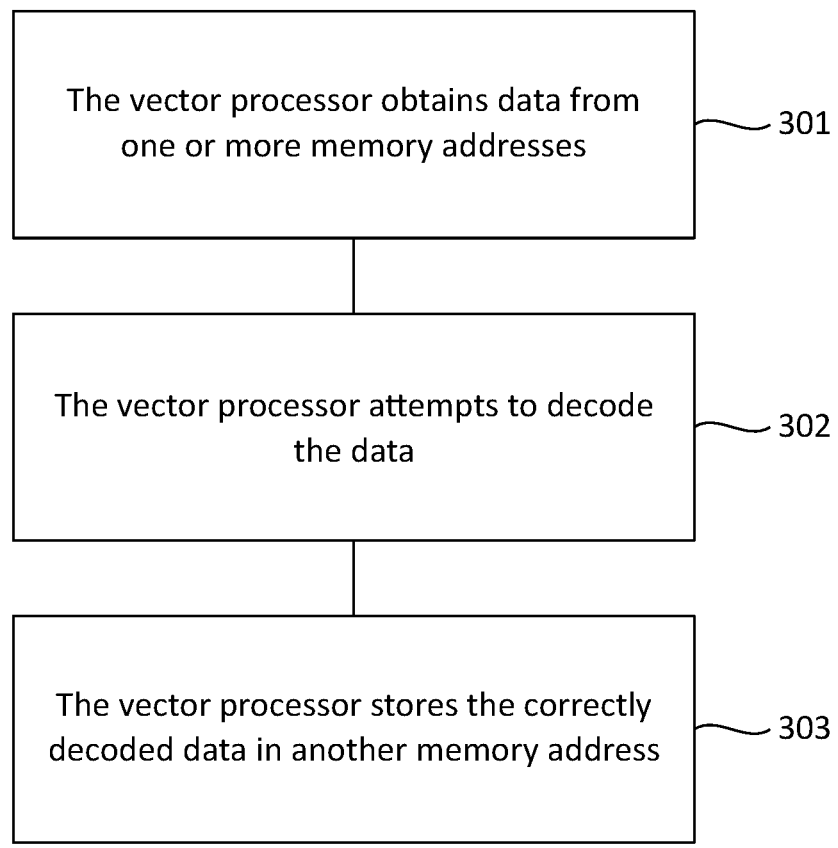
FIG. 3 shows a flow chart of a method which relates to vector processor determine when encoded data is written to memory.

A more detailed view of this operation is shown in FIG. 3.

At step 301, the vector processor obtains data from one or more memory addresses. These memory addresses have been designated in advance.

At step 302, the vector processor attempts to decode the data. If it is known that the data is encoded using a Reed-Solomon code, an appropriate decoding algorithm, such as the Berlekamp-Welch algorithm may be used. It is expected that this decoding will fail when the data has not been written to the memory addresses. Thus, if this attempt fails, the vector processor can revert to step 301. If this attempt succeeds, the vector processor has obtained the data. The vector processor can then optionally move to step 303.

At step 303, the vector processor stores the correctly decoded data in another memory address.

Additionally or alternatively, step 302 may involve computing a checksum of the data. This can be compared to a known checksum for the data. When the computed checksum matches the known checksum, it can be considered that the vector processor has obtained the data.

Method 300 may occur continuously or may be scheduled to occur periodically (such as every 10 ms). While method 300 has been described in relation to a vector processor, it could equally be performed by another kind of processing unit. For example, the same steps could be performed by a CPU.

Erasure Coding

As noted above, erasure coding is an approach in which a piece of data is encoded to form n data fragments. The original data is recoverable from any k data fragments (k≤n). Each data fragment is a w-bit word, where w can be any positive integer. For example, 1-bit and 8-bit are common. Generally, the higher the values for n and w, the more computationally intensive the erasure encoding and decoding process is.

First, the original data is segmented into w×k-bit data segments.

Second, k data fragments $d_1 \ldots d_k$ are formed by separating each data segment into k w-bit sized data words. These are data words.

Third, m=n−k data fragments $c_1 \ldots c_m$ are formed based on linear combinations of the data words with coefficients, such that:

$$c_i = a_{i,0} d_0 + \ldots + a_{i,k} d_k$$

where the arithmetic is defined over the Galois field $GF(2^w)$. These are coding words.

The data fragments can be stored in a stripe over a set of disks, such that the data fragments are distributed over the disks. In some cases, different disks can hold different numbers of data fragments. Optionally, a checksum (such as a cryptographic hash) based on the data segment is also stored. Once all data segments are stored, a further checksum (such as a further cryptographic hash) based on the original data can also be stored.

There are multiple ways to select the coefficients. One approach is to use a Cauchy Reed-Solomon code. This occurs by selecting n numbers in $GF(2^w)$ and partitioning them into two distinct sets $X=\{x_1, \ldots, x_m\}$ and $Y=\{y_1, \ldots, y_k\}$, with $X \cap Y = \emptyset$ such that:

$$a_{i,j} = \frac{1}{x_i + y_j}$$

where the arithmetic is defined over the Galois field $GF(2^w)$.

Once the data is stored, any k of the data fragments can be used to retrieve the data. For example, if the data words $d_1 \ldots d_k$ were obtained, these can be combined using the inverse of how they were segmented. If a coding word $c_i$ is used, a system of equations based on the equation noted above can be solved to obtain the missing data fragment.

Erasure encoding provides an approach which allows for high resilience and flexibility. The data fragments can be stored across multiple independent systems. If m or fewer fragments are lost, the corresponding data segment can be recovered, and thus the original data can be calculated. In addition, any k data fragments can be used to recover the original data, which allows any of the storing systems to respond.

System

Figure 4:
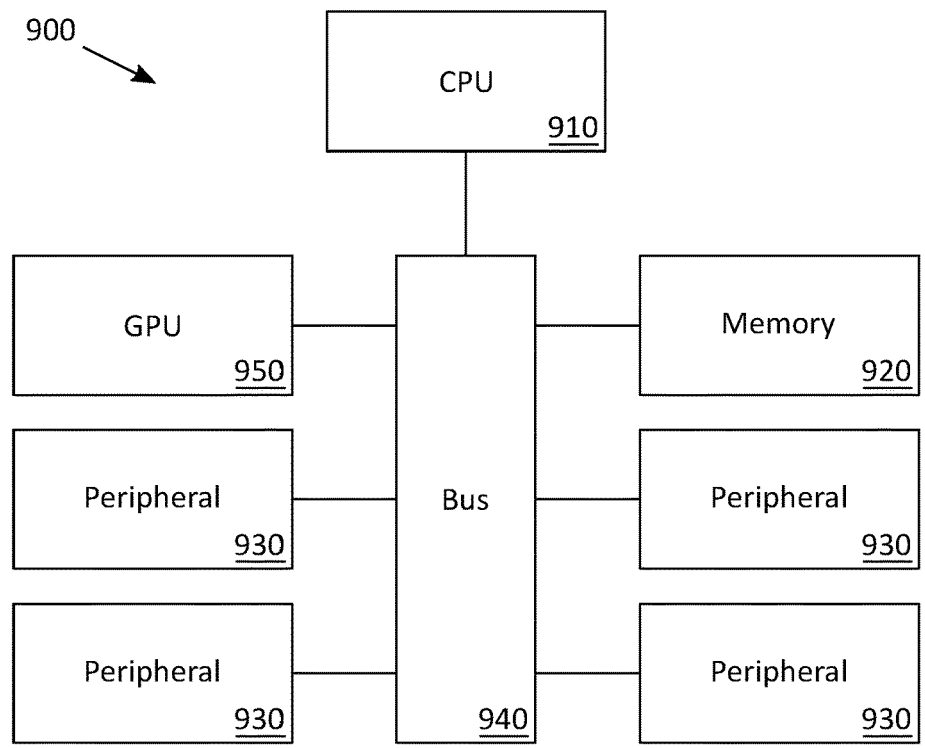
FIG. 4 shows a block diagram of an example computer system.

FIG. 4 shows a block diagram of an example computer system 900.

The system 900 comprises a CPU (central processing unit) 910, a main memory 920, one or more peripherals 930, and a vector processor in the form of a GPU (graphics processing unit) 950. The CPU 910, main memory 920, peripherals 930, and GPU 950 are connected by a bus 940. In the case of a PCIe (PCI Express) topology, the bus 940 includes a root complex, and each of the peripherals 930 and the GPU 950 are PCIe endpoints. The GPU 950 can communicate with the peripherals 930 directly via the bus 940.

The peripherals 930 may include storage devices (such as hard disk drives, solid state drives, or the like), storage controllers (such as RAID controllers), network controllers (such as network interface cards), switches (such as PCIe switches configured to connect further peripherals), or any of a variety of devices.

The peripherals 930 and the GPU 950 may have access to the main memory 920 via the bus 940. Through DMA (direct memory access), this can allow the peripheral 930 or the GPU 950 to read data to and write data from the main memory. This may involve copying the data from main memory 920 to a memory local to the peripheral 930 or the GPU 950.

In some cases, the memory space for the CPU 910 and the GPU 950 can be shared via unified virtual memory. This allows for a pointer to a single memory address to be passed between the CPU and the GPU without the need to copy data between a main memory 920 and a local memory.

Figure 5:
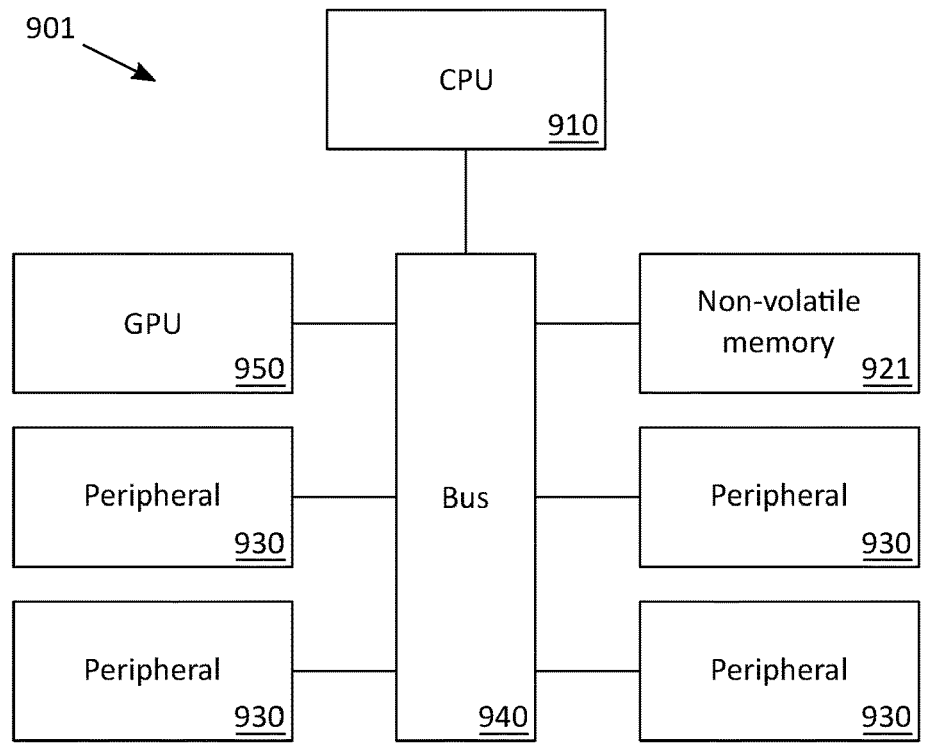
FIG. 5 shows a block diagram of an example computer system having non-volatile memory.

FIG. 5 shows an embodiment of a computer system 900 which can perform the methods noted above. The system 901 shown in FIG. 5 is similar to the system 900 shown in FIG. 4. However, a key difference is that the main memory 920 is non-volatile memory 921, such as an NVDIMM (non-volatile dual in-line memory module). Non-volatile memory 921 is configured so that, if power is lost, the data stored in the non-volatile memory 921 is retained. Once power is re-established, the data can be re-accessed.

In use, when the GPU 950 performs a method involving storage, such as method 100 or method 200, the arrangement of system 901 ensures that data is retained when power is lost, no matter which stage that the read or write operation occurs. For example, if the GPU 950 has performed step 102, this results in data fragments being stored in memory 921. Because non-volatile memory 921 is non-volatile, even if the power is lost, the data fragments will be retained, and the GPU 950 can resume performing the method.

This may allow the GPU 950 to report that the data has been stored (for example, through an acknowledgment), even before step 103 is performed. In addition, this allows the GPU 950 to respond immediately to a flush, since non-volatile memory 921 is pre-flushed. In this way, the apparent performance of a write operation using GPU 950 is higher, even if the underlying storage devices are relatively slow.

Additionally or alternatively, this may be used for journaling. That is, before any data is written to a storage device, it can be stored first on the non-volatile memory 921 along with a checksum and parity information. The data or data fragments are then written from the non-volatile memory to one or more storage devices. This can avoid a write hole: that is, a situation, such as a power loss, in which some data fragments have been written to storage, but others have not. This can result in the data being irretrievable, since insufficient data fragments have been written to storage, and the unwritten data fragments stored in volatile memory have been lost.

Figure 6:
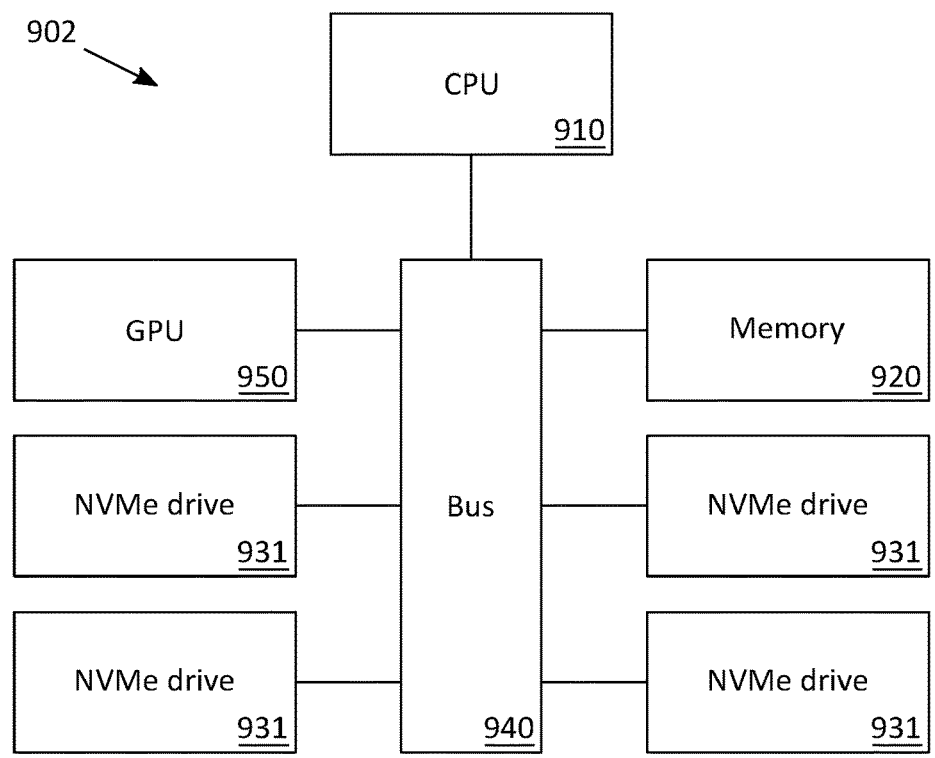
FIG. 6 shows a block diagram of an example computer system having multiple storage devices.

FIG. 6 shows another embodiment of a computer system 900 which can perform the methods noted above. The system 902 shown in FIG. 6 is similar to the system 900 shown in FIG. 4. However, a key difference is that the peripherals 930 comprise four NVMe (non-volatile memory express) drives 931. More or fewer NVMe drives 931 may be used in practice. The GPU 950 can communicate with each NVMe drive 931 directly via the PCIe bus 941.

In use, when the GPU 950 receives performs a method involving storage, such as method 100 or method 200, the performance of the NVMe drives 931 is sufficient to match the throughput of the PCIe bus 941. For example, PCIe bus 941 may have 16 lanes, each of can transmit data at around 1 GB/s per lane. Each NVMe drive 931 may uses an interface of a number of lanes, typically 1, 2, or 4. The number of NVMe drives 931 may be selected so that the total number of lanes of the drives equals the lanes of the PCIe bus 941. For example, 4 four-lane NVMe drives 931 may be used. In this way, the selected NVMe drives 931 fully match the capacity of the PCIe bus 941.

Using system 902, the GPU 950 can write data directly to the NVMe drives 931. Because the throughput of the PCIe bus 941 is the limiting factor, there is little speed difference between whether data is stored in memory 920 or directly to the drives 931.

This sidesteps one of the key advantages of memory 920, that is, that it is conventionally regarded as faster than storage to drives. Thus, in situations where data would be conventionally stored in memory 921 (for example, transient calculations), this can be stored in non-volatile storage without any speed penalty and without the volatility that can occur when data is stored in conventional, volatile memory 920.

Moreover, because NVMe drives do not typically require a driver to be running on the CPU for any of their functions, this avoids any CPU bottleneck in direct interaction with the NVMe drives.

While system 902 has been described with reference to a PCIe bus and NVMe drives, in practice the same benefits can be achieved by any combination of bus and drives if the total throughput of the drives equals or exceeds the capacity of the bus.

Storage Device Peripheral

Figure 7:
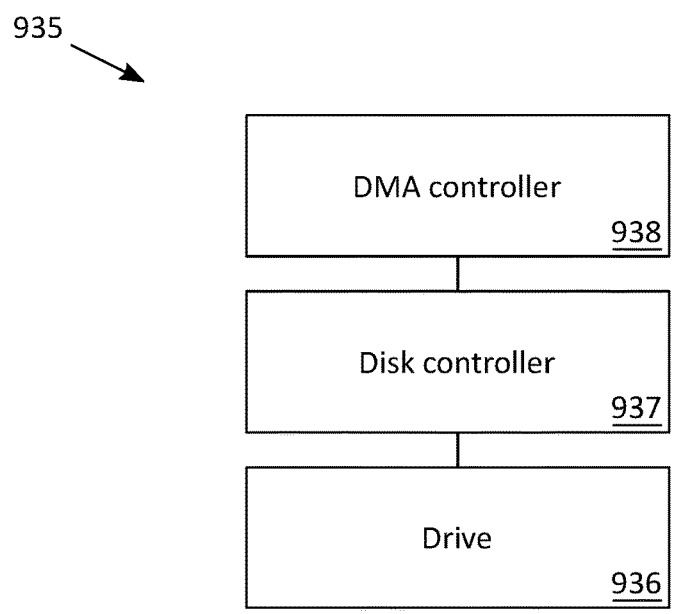
FIG. 7 shows a block diagram of an example storage device.

FIG. 7 shows a block diagram of an example storage device 935. This may be one of the peripherals 930 in the system 900.

The storage device 935 has a drive 936, a disk controller 937, and a DMA controller 938.

The DMA controller 938 receives instructions from the CPU 910 or the GPU 950. The instructions can be provided by the CPU 910 or the GPU 950 programming registers of the DMA controller 938. This may involve a driver running on the CPU 910 or the GPU 950 writing instructions to a virtual memory address mapped to a corresponding register of the DMA controller 938. A memory management unit (MMU) can then translate the virtual memory address to the corresponding register.

A DMA controller 938 may have a number of registers. For example, there may be a first register to hold a starting virtual memory address corresponding to the source of data to be transferred, a second register to hold a starting virtual memory address corresponding to the destination of the data, and a third register to hold the number of bytes or words to be transferred.

The DMA controller 938 iteratively transfers bytes or words from the starting memory address to the destination memory address. This can occur by the DMA controller 938 communicating with the disk controller 937, for example via the bus 940. The DMA controller 938 can program registers of the disk controller 937 to transfer each byte or word. For example, there may be a first register corresponding to the source address of a byte or word and a second register corresponding to the destination address for the byte or word.

Based on the data written to these registers, the disk controller 937 obtains data from the drive 936.

The drive 936 is a physical medium which is capable of storing and reading information. For example, the drive 936 can be a hard disk drive which stores information magnetically on rotating platters using a movable magnetic head. The drive 936 may otherwise be a solid-state drive which stores information in non-volatile memory, such as NAND-based flash memory.

The disk controller 937 may be instructed to retrieve or store data at the drive 936 by the disk controller 937 programming registers of the drive 936. In response to these instructions, the disk controller 937 controls the drive (such as a movable magnetic head in the case of a hard disk drive) to read a block of data from the drive 936 into a data register of the disk controller 937 or to write a block of data from the drive 936 to a data register of the disk controller 937.

Based on data written to the registers of the drive 936, a buffer in the disk controller will be updated to reflect the data. The disk controller 937 can then copy the data in the buffer to a virtual memory address. This virtual memory address may correspond to an address in the main memory of the computer system.

In this way, a CPU 910 or a GPU 950 can store data to and retrieve data from a storage device.

Vector Processor

A vector processor is a processor in which instructions are executed on an array of data. This can be contrasted to conventional CPUs which are scalar and execute an instruction on a single data item. This can allow a vector processor to process a large quantity of data much more quickly than a conventional, scalar CPU.

One example of a vector processor is a GPU. However, a vector processor may be implemented in other forms, such as a field programmable gate array (FPGA).

Figure 8:
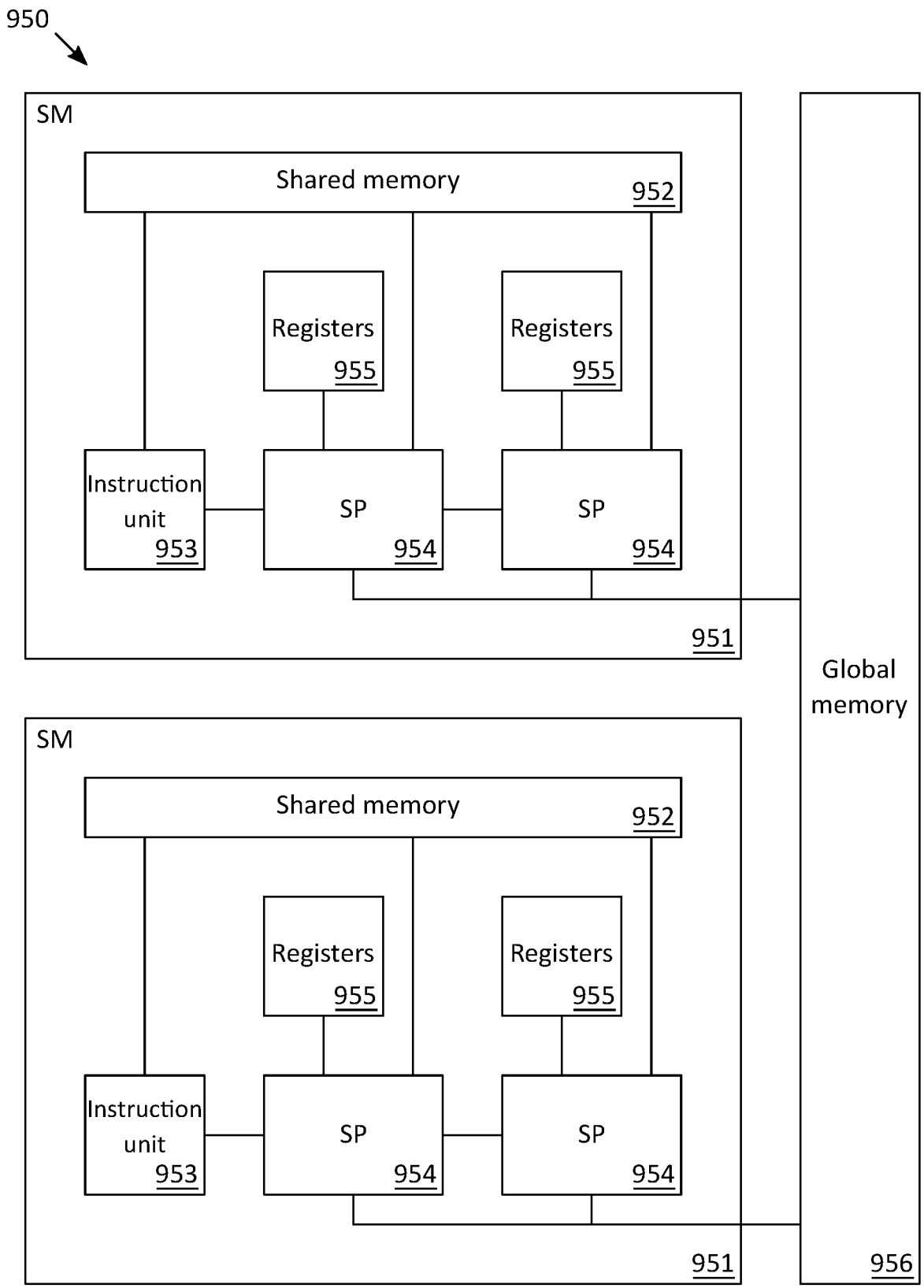
FIG. 8 shows a block diagram of an example vector processor.

An example GPU 950 which operates as a vector processor is shown in FIG. 8. Such a GPU 950 may be used as the vector processor in any of the approaches noted above.

The GPU 950 comprises a number of SMs (streaming multiprocessors) 951, typically between 1 and 30. Each SM 951 has a shared memory 952 and an instruction unit 953.

Each SM 951 comprises a number of SPs (streaming processors) 954, for example 8. Each SP 954 has access to the shared memory 952 and has a set of registers 955. Each SP 954 may also have access to a global memory 956 of the GPU. This global memory 956 may be mapped to main memory 920 of the computer system.

The SPs 954 within an SM 951 receive instructions from the same instruction unit 953. In this way, each SP 954 within an SM typically processes the same instruction at the same time.

The GPU 950 can be configured to run a kernel, which may be a program or function. The kernel may make use of the CUDA platform. Kernels are commonly relatively short-lived (that is, on the order of seconds), as a watchdog timer may kill a kernel if it runs beyond a preset threshold. However, in some cases a kernel may be long-running, in that it can execute indefinitely until execution finishes. Although a kernel runs on a GPU, it is typically initiated by a local or remote CPU.

A kernel is executed by GPU 950 executing a grid corresponding to the kernel. A grid consists of a number of blocks. There is typically no synchronization between blocks in a grid.

Each SM 951 can execute a block of the grid. Typically, an SM 951 can execute multiple blocks at the same time. The number of blocks on an SM 951 may be limited by the capacity of the shared memory 952. Typically, a block does not move from one SM 951 to another SM 951 during the execution of the kernel.

Each SP 954 can execute a thread of the block. In some cases, one SP 954 can handle multiple threads at the same time. A thread is typically a computation comprising a number of instructions. Each instruction may take a number of cycles to perform, for example 4. Because of this latency, an SP 954 can execute multiple threads at once. That is, while one thread is being executed, another thread can be started. Threads may communicate with one another via shared memory 952 of the SM 951.

The GPU 950 may have a SIMD (single instruction, multiple data) architecture. This means that a GPU 950 may operate on the basis of warps. Each warp comprises a number of threads within a block which execute the same instruction in lockstep, though optionally on different data. For example, each thread in a warp may execute an addition instruction to the numbers stored at different memory addresses. In addition, each thread within a warp may be configured to fetch data from memory at the same time.

A warp is resident on an SM 951, such that each thread in a warp may be executed by a different SP 954 within an SM 951. The warp size (that is, the number of threads within a warp that can be executed in lockstep) may be a predetermined value, such as 32. An SM 951 may have multiple resident warps.

In this way, a single kernel can utilize the capacity of the numerous processors available on a GPU. This can result in a kernel being executed significantly more quickly in comparison to other processing units.

Interpretation

A number of methods have been described above. It will be appreciated that any of these methods may be embodied by a series of instructions, which may form a computer program. These instructions, or this computer program, may be stored on a computer readable medium, which may be non-transitory. When executed, these instructions or this program may cause a processor, such as a CPU or vector processor (for example, a GPU), to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors. In some cases, one step may be performed by a first type of processor (for example, processing of large sets of data may be performed by a vector processor) and another step may be performed by a second type of processor (such as metadata lookup being performed by a CPU).

The order of steps within methods may be altered, such that steps are performed out of order or in parallel, except where one step is dependent on another having been performed, or the context otherwise requires.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments and with reference to the drawings, the invention is not intended to be restricted to such details. Additional advantages and modifications will readily appear to those skilled in the art. Therefore, the invention in its broader aspects is not limited to the specific details, representative apparatuses and methods, and illustrative examples shown and described. Accordingly, departures may be made from such details without departure from the spirit or scope of the general inventive concept.

The invention claimed is:

1. A method comprising:
  receiving, at a vector processor, a request to store data;
  performing, by the vector processor, one or more transforms on the data; and
  instructing, by the vector processor, one or more storage devices to store the data;

wherein performing one or more transforms on the data comprises:
  erasure encoding the data to generate n data fragments configured such that any m data fragments are recoverable using k data fragments, where n=m+k; and
wherein instructing one or more storage devices to store the data comprises:
  instructing the one or more storage devices to store the plurality of data fragments.

2. The method of claim 1, wherein performing, by the vector processor, one or more transforms on the data consists of:
  performing, by the vector processor, one or more invertible transforms on the data.

3. The method of claim 1, wherein:
performing one or more transforms on the data further comprises:
  calculating a cryptographic hash for the data; and
instructing one or more storage device to store the data comprises:
  instructing one or more storage devices to store the cryptographic hash for the data.

4. The method of claim 1, wherein performing one or more transforms on the data comprises:
  logging a storage event associated with the request to store data.

5. The method of claim 1, wherein performing one or more transforms on the data comprises:
  encrypting and/or compressing the data.

6. The method of claim 1, wherein performing one or more transforms on the data comprises:
  identifying one or more plugins configured to be used for the one or more transforms.

7. The method of claim 1, wherein storing the data fragments at one or more storage devices comprises:
  instructing, by the vector processor, a storage device to store at least k of the data fragments, where k is the minimum number of data fragments that can be used to regenerate the data.

8. The method of claim 1, wherein receiving, at a vector processor, a request to store data comprises:
  executing a write instruction in a kernel being executed by the vector processor.

9. The method of claim 1, further comprising, before directly instructing one or more storage device to store the data:
  storing, by the vector processor, the data in non-volatile memory.

10. The method of claim 1, wherein instructing one or more storage device to store the data comprises:
  instructing a plurality of storage device in parallel to store the data.

11. A method comprising:
receiving, at a vector processor, a request to retrieve data;
instructing one or more storage devices to retrieve a plurality of data fragments associated with the data from the one or more storage devices; and
performing, by the vector processor, one or more transforms on the data fragments to obtain the data;
wherein the plurality of data fragments comprises at least k data fragments among n erasure encoded data fragments, where any m data fragments are recoverable using k data fragments, and n=m+k; and
wherein performing one or more transforms on the data fragments to obtain the data comprises:
  erasure decoding at least k data fragments to generate the data.

12. The method of claim 11, wherein performing one or more transforms on the data comprises:
  logging a retrieval event associated with the request to retrieve data.

13. The method of claim 11, wherein performing one or more transforms on the data fragments comprises one or more of:
  decrypting and/or decompressing the data; or
  identifying one or more plugins configured to be used for the one or more transforms.

14. The method of claim 11, wherein directly instructing one or more storage devices to retrieve a plurality of data fragments associated with the data from the one or more storage devices comprises:
  sending, by the vector processor to the one or more storage devices, a request for a data fragment associated with the data; and
  receiving, at the vector processor, at least one data fragment associated with the data in response to one or more of the requests.

15. The method of claim 14, wherein the request for a data fragment comprises a memory address, and receiving at least one data fragment comprises:
  reading a memory associated with the memory address; and
  when the data stored in the memory can be used to generate the data, determining that the at least one data fragment has been received.

16. The method of claim 11, wherein receiving a request to retrieve data comprises:
  executing a read instruction in a kernel being executed by the vector processor.

17. A system comprising:
one or more vector processors; and
a memory;
wherein the memory comprises instructions which, when executed by the one or more vector processors, configure the one or more vector processors to perform the method of claim 1.

18. One or more non-transitory computer readable media comprising instructions which, when executed by one or more vector processors, cause the one or more vector processors to perform the method of claim 1.

19. A system comprising:
one or more vector processors; and
a memory;
wherein the memory comprises instructions which, when executed by the one or more vector processors, configure the one or more vector processors to perform the method of claim 11.

20. One or more non-transitory computer readable media comprising instructions which, when executed by one or more vector processors, cause the one or more vector processors to perform the method of claim 11.

* * * * *